(12) United States Patent
Terado et al.

(10) Patent No.: US 7,645,852 B2
(45) Date of Patent: Jan. 12, 2010

(54) ALIPHATIC POLYESTER COPOLYMER

(75) Inventors: Yuji Terado, Omuta (JP); Masaru Wada, Omuta (JP); Tatsuhiro Urakami, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 95 days.

(21) Appl. No.: 11/597,931

(22) PCT Filed: May 25, 2005

(86) PCT No.: PCT/JP2005/009519

§ 371 (c)(1), (2), (4) Date: Nov. 29, 2006

(87) PCT Pub. No.: WO2005/116110

PCT Pub. Date: Dec. 8, 2005

(65) Prior Publication Data

US 2008/0015331 A1     Jan. 17, 2008

(30) Foreign Application Priority Data

May 31, 2004    (JP) ............................. 2004-160392

(51) Int. Cl.
*C08G 63/00* (2006.01)
*C08G 63/02* (2006.01)

(52) U.S. Cl. .................. 528/271; 514/471; 524/745; 524/784; 528/272; 528/480; 528/481; 528/491; 528/494

(58) Field of Classification Search .......... 514/471; 524/745, 784; 528/271, 272, 480, 481, 491, 528/492

See application file for complete search history.

(56) References Cited

U.S. PATENT DOCUMENTS

| | | | |
|---|---|---|---|
| 4,506,066 A | | 3/1985 | Medem et al. |
| 5,844,066 A | * | 12/1998 | Kakizawa .................... 528/354 |
| 5,847,011 A | | 12/1998 | Terado et al. |
| 6,063,464 A | | 5/2000 | Charbonneau et al. |
| 6,093,792 A | | 7/2000 | Gross et al. |
| 6,126,992 A | * | 10/2000 | Khanarian et al. .......... 427/162 |
| 6,156,866 A | | 12/2000 | Schuhmacher et al. |

FOREIGN PATENT DOCUMENTS

| | | |
|---|---|---|
| EP | 0025937 A2 | 4/1981 |
| EP | 0778306 A2 | 6/1997 |
| JP | P2003-292603 A | 10/2003 |
| WO | WO 98/05698 A1 | 2/1998 |
| WO | WO 99/54119 A1 | 10/1999 |

OTHER PUBLICATIONS

Braun et al.; "Polymers from 1,4:3,6-Dianhydrosorbitol"; Journal für praktische Chemie Chemiker-Zeitung; 1992; pp. 298-310; vol. 334; Johann Ambrosius Barth.

* cited by examiner

*Primary Examiner*—Terressa M Boykin
(74) *Attorney, Agent, or Firm*—Buchanan Ingersoll & Rooney PC

(57) ABSTRACT

An aliphatic polyester copolymer comprising an aliphatic carbonate unit (a) and an aliphatic polyester unit (b), and a molded body composed of said aliphatic polyester copolymer. The aliphatic polyester copolymer is excellent in heat resistance while having adequate mechanical properties and properties in the molten state.

11 Claims, No Drawings

ALIPHATIC POLYESTER COPOLYMER

TECHNICAL FIELD

The present invention relates to a high molecular weight aliphatic polyester copolymer which is excellent in heat resistance. More specifically, it relates to an aliphatic polyester copolymer containing an aliphatic polycarbonate unit (a) represented by the general formula (1) and an aliphatic polyester unit (b):

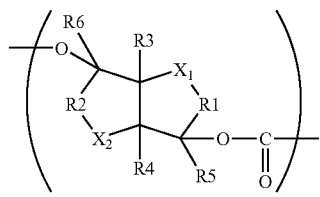
(1)

wherein $X_1$ and $X_2$ are O, N—R7 or S, and may be the same or different, R1 and R2 are an alkylene chain having from 1 to 10 carbon atoms, and may be linear or branched, and R3 to R7 are a hydrogen atom, an alkyl group having 1 to 10 carbon atoms, a cycloalkyl group or a phenyl group, the alkyl group may be linear or branched, and the cycloalkyl group and phenyl group may have a substituent.

Further, the present invention relates to a molded body, an optical disc substrate, a sheet and a container, comprising the aliphatic polyester copolymer.

BACKGROUND ART

In recent years, interest in environmental protection is increasing. In Japan, purchase promotion of environment-friendly materials by Law of Promoting Green Purchasing, recycling promotion of plastic materials by Containers and Packaging Recycling Law and of electric appliance by Home Appliance Recycling Law, and the like are its manifestation. In such a series of a current, polymers such as an aliphatic polyester and an aliphatic polycarbonate, having low environmental load are attracting attention.

A polylactic acid which is one of aliphatic polyesters has the characteristics to have high transparency, be tough, and easily hydrolyze in the presence of water. Therefore, in the case of using as a general-purpose resin, it decomposes without environmental pollution after disposal, and thus is environment-friendly. Further, in the case of remaining in a living body as a medical material, it is decomposed and absorbed in a living body without exerting toxicity to the living body after accomplishment of the purpose as the medical material, and thus is living body-friendly.

However, from the standpoint of heat resistance, it is difficult to say that the polylactic acid is adequate to use the same as a general-purpose resin. For this reason, emergence of homopolymers or copolymers of an aliphatic polyester or an aliphatic polycarbonate, having adequately high heat resistance and molecular weight is eagerly desired.

As one of aliphatic polycarbonates, a polycarbonate prepared from isosorbide and phosgene is disclosed in Non-Patent Document 1. According to this, it is described that this polycarbonate has Mw of 32,000, but a high molecular weight polycarbonate having Mw of 35,000 or more is not described. Further, in Patent Document 1, there is the description regarding a copolymer of 1,2-O-isopropylidene-D-xylofuranose-3,5-cyclic carbonate (IPXTC) which is an aliphatic cyclic carbonate, and a polylactic acid. According to this, it is described that the copolymer of 60 mol % of IPXTC as an aliphatic polycarbonate component, with a polylactic acid has Tg of 90° C. However, a compositional ratio of the copolymer of PLA and IPXTC, containing 60 mol % of IPXTC is converted into a weight ratio of PLA/IPXTC=18/82 (wt %), and an expensive IPXTC must be used in a large amount. Further, there are the problems that where the amount of IPXTC added is increased, the yield decreases, and the molecular weight of a copolymer obtained becomes low.

From the above facts, an aliphatic polymer having adequately high heat resistance and molecular weight and capable of producing economically is not known.

Patent Document 1: U.S. Pat. No. 6,093,792, pages 5-10
Non-Patent Document 1: Journal Fur Praktische Chemie Chemiker-Zeitung (1992), 334 (4), pages 298-310

DISCLOSURE OF THE INVENTION

Problems that the Invention is to Solve

An object of the present invention is to provide a high molecular weight aliphatic polyester copolymer which is excellent in heat resistance.

Means for Solving the Problems

As a result of keen investigations in view of the above problems in the prior art, the present inventors have found an aliphatic polyester copolymer containing an aliphatic polycarbonate unit (a) represented by the general formula (1) and an aliphatic polyester unit (b),

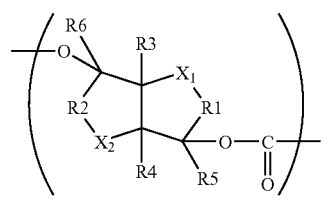
(1)

wherein $X_1$ and $X_2$ are O, N—R7 or S, and may be the same or different, R1 and R2 are an alkylene chain having from 1 to 10 carbon atoms, and may be linear or branched, and R3 to R7 are a hydrogen atom, an alkyl group having 1 to 10 carbon atoms, a cycloalkyl group or a phenyl group, the alkyl group may be linear or branched, and the cycloalkyl group and phenyl group may have a substituent.

and have reached to complete the present invention.

That is, the aliphatic polyester copolymer according to the present invention is specified by the items described in the following [1] to [11].

[1] An aliphatic polyester copolymer comprising an aliphatic polycarbonate unit (a) represented by the general formula (1) and an aliphatic polyester unit (b):

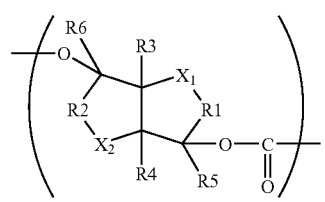
(1)

wherein $X_1$ and $X_2$ are O, N—R7 or S, and may be the same or different, R1 and R2 are an alkylene chain having from 1 to 10 carbon atoms, and may be linear or branched, and R3 to R7 are a hydrogen atom, an alkyl group having 1 to 10 carbon atoms, a cycloalkyl group or a phenyl group, the alkyl group may be linear or branched, and the cycloalkyl group and phenyl group may have a substituent.

[2] The aliphatic polyester copolymer as described in [1], characterized in that the aliphatic polycarbonate unit (a)

has a structure derived from a product prepared from isosorbide and a carbonate precursor.

[3] The aliphatic polyester copolymer as described in [1] or [2], characterized in that the aliphatic polyester unit (b) has a structure derived from lactic acid.

[4] The aliphatic polyester copolymer as described in anyone of [1] to [3], characterized in that a compositional ratio of the aliphatic polycarbonate unit (a) and the aliphatic polyester unit (b) is (a)/(b)=5/95 to 50/50 wt %.

[5] The aliphatic polyester copolymer as described in [1], characterized in that a weight average molecular weight of the aliphatic polyester copolymer is from 10,000 to 500,000.

[6] The aliphatic polyester copolymer as described in [1], characterized in that a glass transition temperature of the aliphatic polyester copolymer is higher than a glass transition temperature of an aliphatic polyester having the same repeating unit as the aliphatic polyester unit (b) contained in the aliphatic polyester copolymer.

[7] The aliphatic polyester copolymer as described in [1], characterized in that Haze of the aliphatic polyester copolymer is 5% or less.

[8] A molded body comprising the aliphatic polyester copolymer as described in [1].

[9] An optical disc substrate comprising the aliphatic polyester copolymer as described in [1].

[10] A sheet comprising the aliphatic polyester copolymer as described in [1].

[11] A container comprising the aliphatic polyester copolymer as described in [1].

Effect of the Invention

The aliphatic polyester copolymer of the present invention comprising the aliphatic polycarbonate unit (a) represented by the formula (1) and the aliphatic polyester unit (b) has excellent heat resistance and practically adequate mechanical properties and melting properties, and can suitably be used to an optical disc substrate, a container, a packaging material and the like.

Best Mode for Carrying Out the Invention

The present invention relates to a high molecular weight aliphatic polyester copolymer which is excellent in heat resistance. In detail, it relates to an aliphatic polyester copolymer containing an aliphatic polycarbonate unit (a) represented by the general formula (1),

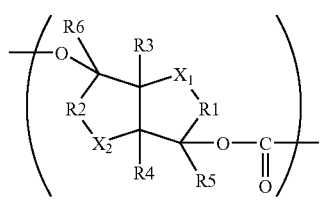
(1)

wherein $X_1$ and $X_2$ are O, N—R7 or S, and may be the same or different. Further, R1 and R2 are an alkylene chain having from 1 to 10 carbon atoms, and may be linear or branched. Further, R3 to R7 are a hydrogen atom, an alkyl group having 1 to 10 carbon atoms, a cycloalkyl group or a phenyl group, wherein the alkyl group may be linear or branched, and the cycloalkyl group and phenyl group may have a substituent, and an aliphatic polyester unit (b).

The aliphatic polycarbonate used in the present invention is preferably a polycarbonate containing the aliphatic polycarbonate unit (a) represented by the general formula (1):

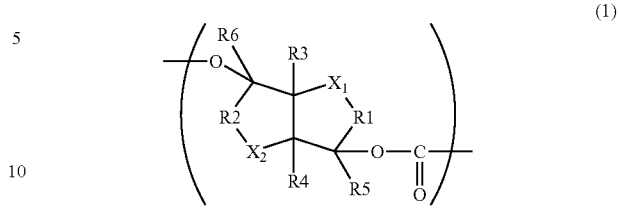
(1)

wherein $X_1$ and $X_2$ are O, N—R7 or S, and may be the same or different. Further, R1 and R2 are an alkylene chain having from 1 to 10 carbon atoms, and may be linear or branched. Further, R3 to R7 are a hydrogen atom, an alkyl group having 1 to 10 carbon atoms, a cycloalkyl group or a phenyl group, wherein the alkyl group may be linear or branched, and the cycloalkyl group and phenyl group may have a substituent.

Above all, an aliphatic polycarbonate comprising isosorbide represented by the chemical formula (2)

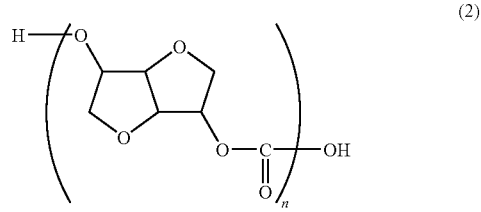
(2)

and a carbonate precursor is preferable.

A method for producing the aliphatic polycarbonate used in the present invention is not particularly limited, but there is, for example, a method of reacting a dihydric alcohol represented by the general formula (3),

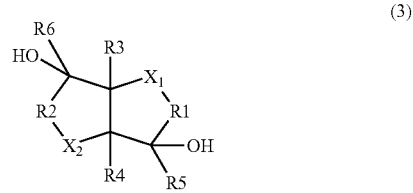
(3)

wherein $X_1$ and $X_2$ are O, N—R7 or S, and may be the same or different, R1 and R2 are an alkylene chain having from 1 to 10 carbon atoms, and may be linear or branched, R3 to R7 are a hydrogen atom, an alkyl group having 1 to 10 carbon atoms, a cycloalkyl group or a phenyl group, wherein the alkyl group may be linear or branched, and the cycloalkyl group and phenyl group may have a substituent, with a carbonate precursor.

The dihydric alcohol used to produce the aliphatic polycarbonate used in the present invention is preferably represented by the general formula (3),

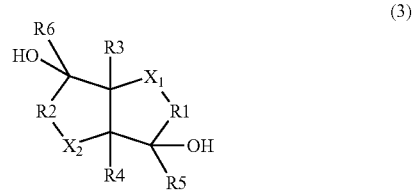
(3)

wherein $X_1$ and $X_2$ are O, N—R7 or S, and may be the same or different. Further, R1 and R2 are an alkylene chain having from 1 to 10 carbon atoms, and may be linear or branched.

Further, R3 to R7 are a hydrogen atom, an alkyl group having 1 to 10 carbon atoms, a cycloalkyl group or a phenyl group, the alkyl group may be linear or branched, and the cycloalkyl group and phenyl group may have a substituent. The dihydric alcohol may be used alone or as mixtures of two or more thereof.

The carbonate precursor used to produce the aliphatic polycarbonate used in the present invention means a carbonyl equivalent which gives a polycarbonate by reacting with the dihydric alcohol having two hydroxyl groups, and as the specific examples thereof, a carbonyl halide, a carbonyl ester, a haloformate and the like are exemplified. Specifically, phosgene, diphenyl carbonate and the like are exemplified.

The carbonate precursor may be used alone or as mixtures of two or more thereof.

The aliphatic polycarbonate used in the present invention is produced by the conventional methods such as a solution method and a melting method. Further, in such a case, appropriate molecular weight regulator, branching agent, other modifiers and the like may be added.

The molecular weight of the aliphatic polycarbonate used in the present invention is not particularly limited. In general, considering thermal properties and mechanical properties of the aliphatic polyester copolymer obtained, it is preferably from 5,000 to 200,000, more preferably from 10,000 to 100,000, and most preferably from 40,000 to 100,000, in terms of a weight average molecular weight (Mw).

The glass transition temperature of the aliphatic polycarbonate used in the present invention is preferably from 100 to 300° C., and more preferably from 140 to 240° C.

The aliphatic polycarbonate used in the present invention may be a homopolymer or a copolymer. Arrangement mode of the copolymer may be any of a random copolymer, an alternating copolymer, a block copolymer, a graft copolymer and the like.

The structure of the aliphatic polycarbonate used in the present invention may be any of a linear structure, a branched structure, a star structure and a three-dimensional network structure.

In the present invention, the aliphatic polyester unit (b) means a structure derived from an aliphatic hydroxycarboxylic acid and/or an aliphatic dihydric alcohol and an aliphatic dibasic acid. The hydroxycarboxylic acid means a compound containing at least one hydroxyl group and at least one carboxyl group in the molecule.

The aliphatic polyester (B) used in the present invention means a polymer containing the aliphatic polyester unit (b), and is specifically represented by any of the following (1) to (3).

(1) A homopolymer and/or a copolymer of a polyester produced from an aliphatic hydroxycarboxylic acid, a cyclic monomer (lactone) or a cyclic dimer of the aliphatic hydroxycarboxylic acid, and the like (hereinafter referred to as an aliphatic polyester (B1)).

(2) A homopolymer and/or a copolymer of a polyester produced from an aliphatic dihydric alcohol and an aliphatic dibasic acid (hereinafter referred to as an aliphatic polyester (B2)).

(3) A copolymer of the aliphatic polyester (B1) and the aliphatic polyester (B2) (hereinafter referred to as an aliphatic polyester (B3)).

Further, the structure of the aliphatic polyester (B) may be any of a linear structure, a branched structure, a star structure and a three-dimensional network structure. An appropriate branching agent may be used in order to obtain the aliphatic polyester of a branched structure, a star structure and a three-dimensional network structure.

The aliphatic polyesters (B1) to (B3) used in the present invention are produced using raw materials described below by the conventional method.

The aliphatic hydroxycarboxylic acid which is a raw material of the aliphatic polyester (B1) is an aliphatic carboxylic acid having a hydroxyl group in the molecule, and is not particularly limited. As the suitable examples, lactic acid, glycolic acid, 3-hydroxybutyric acid, 4-hydroxybutyric acid, 4-hydroxyvaleric acid, 5-hydroxyvaleric acid, 6-hydroxycaproic acid and the like are exemplified. From the viewpoint of transparency of the aliphatic polyester copolymer obtained, lactic acid is preferable.

Further, a cyclic monomer (lactone) and a cyclic dimer of the aliphatic hydroxycarboxylic acid may be used to produce the aliphatic polyester copolymer according to the present invention. Specifically, lactide, glycolide, β-propiolactone, β-butyrolactone, γ-butyrolactone, γ-valerolactone, δ-valerolactone, ε-caprolactone and the like are exemplified.

Further, those aliphatic hydroxycarboxylic acids may be used alone or as a combination of two or more thereof, but in the case of using by combining two or more of the aliphatic hydroxycarboxylic acids, it is preferable to be one containing lactic acid (combination of lactic acid and other aliphatic hydroxycarboxylic acid) from the viewpoint of transparency of the aliphatic polyester copolymer obtained.

Further, in the case of having an asymmetric carbon in the molecule like lactic acid, D-form, L-form and a mixture of equal parts of those (racemic body) are present, but any of those can be used.

The aliphatic dihydric alcohol and aliphatic dibasic acid that are raw materials of the aliphatic polyester (B2) are not particularly limited. Suitable specific examples of the aliphatic dihydric alcohol include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanediol, isosorbide and 1,4-cyclohexane dimethanol and the like. Those can be used alone or as mixtures of two or more thereof. In the case of having an asymmetric carbon in the molecule, D-form, L-form and a mixture of equal parts of those (racemic body) are present, but any of those can be used.

Further, suitable specific examples of the aliphatic dibasic acid include aliphatic dicarboxylic acids such as succinic acid, oxalic acid, malonic acid, glutaric acid, adipic acid, pimelic acid, suberic acid, azelaic acid, sebacic acid, undecanoic diacid, dodecanoic diacid and 3,3-dimethylpentanoic diacid; and alicyclic dicarboxylic acids such as cyclohexanedicarboxylic acid. Those can be used alone or as mixtures of two or more thereof. In the case of having an asymmetric carbon in the molecule, D-form, L-form and a mixture of equal parts of those (racemic body) are present, but any of those can be used.

The suitable branching agent to obtain the aliphatic polyester having a branched, star or three-dimensional network structure is not particularly limited so long as it is a compound having at least three hydroxyl groups and/or carboxyl groups, and may be a polymer such as a polysaccharide, or a low molecular compound such as an aliphatic polyhydric alcohol or an aliphatic polybasic acid.

Specific examples of the polysaccharide include cellulose, cellulose nitrate, cellulose acetate, methyl cellulose, ethyl cellulose, CMC (carboxymethyl cellulose), nitrocellulose, cellophane, a regenerated cellulose such as viscose rayon or cupra, hemicellulose, starch, amylopectin, dextrin, dextran, glycogen, pectin, chitin, chitosan, their mixtures, and their derivatives. Of those, cellulose acetate which is an esterified cellulose, and ethyl cellulose which is an etherified cellulose are particularly preferable.

The weight average molecular weight of the polysaccharide is preferably 3,000 or more, and more preferably 10,000 or more. Degree of substitution of the esterified cellulose and etherified cellulose is preferably from 0.3 to 3.0, and more preferably from 1.0 to 2.8.

Specific examples of the aliphatic polyhydric alcohol having at least three hydroxyl groups include glycerin, pentaerythritol, dipentaerythritol, trimethylolethane, trimethylolpropane, xylitol and inositol. Those can be used alone or as mixtures of two or more thereof. In the case of having an asymmetric carbon in the molecule, D-form, L-form and a mixture of equal parts of those (racemic body) are present, but any of those can be used.

Specific examples of the aliphatic polybasic acid having at least three carboxyl groups include cyclic compounds such as 1,2,3,4,5,6-cyclohexanehexacarboxylic acid, 1,2,3,4-cyclopentanetetracarboxylic acid, tetrahydrofuran 2R,3T,4T,5C-tetracarboxylic acid, 1,2,3,4-cyclobutanetetracarboxylic acid, 4-caroxy-1,1-cyclohexanediacetic acid, 1,3,5-cyclohexanetricarboxylic acid, (1α,3α,5β)-1,3,5-trimethyl-1,3,5-cyclohexanetricarboxylic acid and 2,3,4,5-furantetracarboxylic acid, and its anhydride; and linear compounds such as butane-1,2,3,4-tetracarboxylic acid, meso-butane-1,2,3,4-tetracarboxylic acid, 1,3,5-pentanetricarboxylic acid, 1,2,3-propanetricarboxylic acid, 1,1,2-ethanetricarboxylic acid and 1,2,4-butanetricarboxylic acid, and its anhydride. Those can be used alone or as mixtures of two or more thereof. In the case of having an asymmetric carbon in the molecule, D-form, L-form and a mixture of equal parts of those (racemic body) are present, but any of those can be used.

A method for producing the aliphatic polyester of a branched, star or three-dimensional network structure is not particularly limited. For example, it can be obtained by dehydropolycondensation reaction of an aliphatic hydroxycarboxylic acid, an aliphatic polyhydric alcohol having at least three hydroxyl groups and an aliphatic polybasic acid having at least two carboxyl groups, or an aliphatic hydroxycarboxylic acid, an aliphatic polybasic acid having at least three carboxyl groups and an aliphatic polyhydric alcohol having at least two hydroxyl groups.

Compositions of the aliphatic polyhydric alcohol having at least three hydroxyl groups and the aliphatic polybasic acid having at least two carboxyl groups and/or its acid anhydride; and the aliphatic polybasic acid having at least three carboxyl groups and/or its acid anhydride and the polyhydric alcohol having at least two hydroxyl groups are as follows. That is, the weight of the aliphatic polyhydric alcohol having at least three hydroxyl groups, and the aliphatic polybasic acid having at least three carboxyl groups and/or its acid anhydride corresponds to from 0.005 to 10%, and preferably from 0.01 to 5%, on the basis of weight of a polymer in the case of assuming that the aliphatic polyester is completely polymerized alone, and additionally, the equivalent ratio of hydroxyl groups of the aliphatic polyhydric alcohol having at least three hydroxyl groups to carboxyl groups of the aliphatic polybasic acid having at least two carboxyl groups and/or its acid anhydride; and the equivalent ratio of carboxyl groups of the aliphatic polybasic acid having at least three carboxyl groups and/or its acid anhydride to hydroxyl groups of the polyhydric alcohol having at least two hydroxyl groups correspond to from 100:30 to 300, preferably 100:80 to 120, and more preferably 100:90 to 110.

The molecular weight of the aliphatic polyester is not particularly limited. Considering mechanical strength of the aliphatic polyester copolymer obtained, it is preferably from 5,000 to 1,000,000, more preferably from 10,000 to 500,000, and most preferably from 100,000 to 300,000, in terms of a weight average molecular weight (Mw).

The glass transition temperature of the aliphatic polyester used in the present invention is preferably from −70 to 100° C., and more preferably from 30 to 70° C.

In the present invention, the compositional ratio of the aliphatic polycarbonate and the aliphatic polyester is not particularly limited. However, the proportion of from 5 to 95 wt % of the aliphatic polycarbonate and from 95 to 5 wt % of the aliphatic polyester is preferable, the proportion of from 10 to 50 wt % of the aliphatic polycarbonate and from 90 to 50 wt % of the aliphatic polyester is further preferable, and the proportion of from 20 to 40 wt % of the aliphatic polycarbonate and from 80 to 60 wt % of the aliphatic polyester is more preferable (provided that the total of wt % of the aliphatic polycarbonate and wt % of the aliphatic polyester is 100). There is the characteristic that when the proportion of the aliphatic polycarbonate increases, the glass transition temperature of the aliphatic polyester copolymer rises.

The aliphatic polyester copolymer according to the present invention is not particularly limited in its reaction method so long as the aliphatic polycarbonate unit (a) represented by the general formula (1):

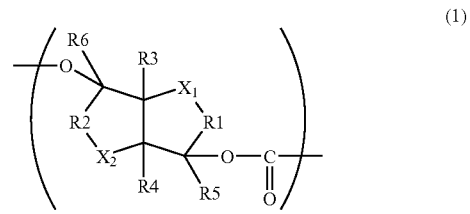

wherein $X_1$ and $X_2$ are O, N—R7 or S, and may be the same or different. Further, R1 and R2 are an alkylene chain having from 1 to 10 carbon atoms, and may be linear or branched. Further, R3 to R7 are a hydrogen atom, an alkyl group having 1 to 10 carbon atoms, a cycloalkyl group or a phenyl group, wherein the alkyl group may be linear or branched, and the cycloalkyl group and phenyl group may have a substituent, and the aliphatic polyester unit (b) are contained. Specifically, the aliphatic polycarbonate and the aliphatic polyester may be reacted in an organic solvent, or the aliphatic polycarbonate and a cyclic monomer or a cyclic dimer of an aliphatic hydroxycarboxylic acid may be reacted in a molten state.

The method for producing the aliphatic polyester copolymer according to the present invention can use the conventional method, and is not particularly limited. Specifically, a melt polymerization method, a solution polymerization method, a sold phase polymerization method and the like are exemplified. An optimum reaction method can be selected considering the raw material used, physical properties of the aliphatic polyester copolymer obtained, and the like.

The melt polymerization method is excellent in volume efficiency, and therefore, reaction can be conducted with a relatively small polymerization vessel as compared with a polymerization vessel of the solution polymerization method.

In the solution polymerization method the reaction can be conducted at relatively low temperature, and therefore, it is liable to obtain aliphatic polyester copolymer having relatively small coloration. The solid phase polymerization method is excellent in volume efficiency and can conduct reaction at relatively low temperature, and therefore, this is an effective reaction method if the aliphatic polyester copolymer has crystallizability.

In producing the aliphatic polyester copolymer according to the present invention, it is preferable to generally conduct the reaction under vacuum or an inert gas atmosphere such as nitrogen or argon for the purpose of, for example, suppressing deactivation of a catalyst or coloration of the copolymer.

Further, all of operations to produce the aliphatic polyester copolymer according to the present invention can be conducted by any of a continuous operation and a batchwise operation.

In the present invention, a catalyst may be used in producing the aliphatic polyester copolymer. The catalyst is not particularly limited so long as an aliphatic polycarbonate having a cyclic structure containing a heteroatom in a main chain and/or a side chain is reacted with an aliphatic polyester to form an aliphatic polyester copolymer. Specific examples of the catalyst include a metal of Groups II, III, IV and V of a periodic table, and its oxide or salt.

More specifically, the examples include metals such as zinc powder, tin powder, aluminum, magnesium and germanium; metal oxides such as tin (II) oxide, antimony (III) oxide, zinc oxide, aluminum oxide, magnesium oxide, titanium (IV) oxide, germanium (II) oxide and germanium (IV) oxide; metal halide compounds such as tin (II) chloride, tin (IV) chloride, tin (II) bromide, tin (IV) bromide, antimony (III) fluoride, antimony (V) fluoride, zinc chloride, magnesium chloride and aluminum chloride; sulfates such as tin (II) sulfate, zinc sulfate and aluminum sulfate; carbonates such as magnesium carbonate and zinc carbonate; borates such as zinc borate; organic carboxylates such as tin (II) acetate, tin (II) octanoate, tin (II) lactate, zinc acetate and aluminum acetate; and organic sulfonates such as tin (II) trifluoromethanesulfonate, zinc trifluoromethanesulfonate, magnesium trifluoromethanesulfonate, tin (II) methanesulfonate and tin (II) p-toluenesulfonate.

Other examples include organic sulfonic acids such as methanesulfonic acid and p-toluenesulfonic acid; organic metal oxides of the above metals, such as dibutyltin oxide; metal alkoxides of the above metals, such as titanium isopropoxide; and alkyl metals of the above metals, such as zinc diethyl.

Of those, tin series catalysts represented by tin powder (metallic tin), tin (II) oxide, tin (II) octanoate, tin (II) lactate and tin (II) chloride are preferable. Those can be used alone or as mixtures of two or more thereof.

The amount of the catalyst used in the present invention is not particularly limited so long as it is an amount to an extent such that the reaction can substantially proceed. The specific amount of the catalyst used varies depending on the kind of catalyst used. However, in general, a range of from 0.00005% to 5% by weight of the aliphatic polyester copolymer obtained is preferable, and considering economic efficiency, a range of from 0.0001% to 1 by weight is more preferable.

In producing the aliphatic polyester copolymer of the present invention by a solution polymerization method, the organic solvent used is not particularly limited so long as copolymerization reaction between the aliphatic polycarbonate and the aliphatic polyester progresses. However, to enable the reaction to progress with good efficiency, the solvent is preferably an organic solvent that dissolves both the aliphatic polycarbonate and the aliphatic polyester.

Specific examples of the organic solvent that can be used in the present invention include hydrocarbon solvents such as toluene, xylene and mesitylene; halogenated hydrocarbon solvents such as chlorobenzene, bromobenzene, iodobenzene, dichlorobenzene, 1,1,2,2-tetrachloroethane and p-chlorotoluene; ketone solvents such as 3-hexanone, acetophenone and benzophenone; ether solvents such as dibutyl ether, anisole, phenetole, o-dimethoxybenzene, p-dimethoxybenzene, 3-methoxytoluene, diphenyl ether, dibenzyl ether, benzylphenyl ether and methoxynaphthalene; thioether solvents such as phenyl sulfide and thioanisole; ester series solvents such as methyl benzoate, dimethyl phthalate and diethyl phthalate; alkyl-substituted diphenyl ethers such as 4-methylphenyl ether, 3-methylphenyl ether and 3-phenoxytoluene; halogen-substituted diphenyl ethers such as 4-bromophenyl ether, 4-chlorophenyl ether, 4-bromodiphenyl ether and 4-methyl-4'-bromodiphenyl ether; alkoxy-substituted diphenyl ethers such as 4-methoxydiphenyl ether, 4-methoxyphenyl ether, 3-methoxyphenyl ether and 4-methyl-4'-methoxydiphenyl ether; or cyclic diphenyl ethers such as dibenzofuran and xanthene; nitrogen-containing solvents such as 1,3-dimethyl-2-imidazolidinone and N,N-dimethylacetamide; and sulfur-containing solvents such as dimethylsulfoxide and sulfolane. Above all, the ether solvents, halogenated hydrocarbon solvents and nitrogen-containing solvents are preferable. Of those, 1,3-dimethyl-2-imidazolidinone is particularly preferable.

Those organic solvents can be used in one kind or as mixtures of two or more thereof.

The boiling point of the organic solvent used in the present invention is not particularly limited so long as reaction can be conducted, but is preferably 100° C. or higher, more preferably 140° C. or higher, and particularly preferably 170° C. or higher.

The amount of the organic solvent used in the present invention is not particularly limited so long as the reaction substantially proceeds. In general, the amount is determined taking into consideration reaction rate, volume efficiency, solvent recovery and the like from the industrial standpoint.

The amount of the organic solvent used in the present invention is generally preferably from 0.1 to 9 times on the basis of the weight of the aliphatic polyester copolymer obtained.

In the method for producing the aliphatic polyester copolymer according to the present invention, reaction in the organic solvent may be conducted by that in at least a part of process in the overall process, water present in the reaction system is decreased by batchwise and/or continuous water removal operations. The water removal operation may be a circulation system or a reflux system.

The water removal operation of the present invention is not particularly limited so long as water present in the reaction system can be decreased as described above. Specifically, there are the following methods.

1) A method of removing water by previously charging excess organic solvent in a reactor, and discharging only the organic solvent.
2) A method of removing water by drying the organic solvent in the reaction system using other organic solvent.
3) A method of removing water, wherein at least a part of the organic solvent in the reaction system is taken out, and subjected to, for example, a treatment of contacting with a drying agent or a distillation treatment utilizing difference in boiling point, outside the reaction system to reduce the water content to lower than the water content of the organic solvent taken out of the reaction system, and such an organic solvent is charged in the reaction system.

In the case of removing water in the reaction system by the above water removal operation, the water content of the organic solvent charged in the reaction system is preferably 50 ppm or less, more preferably 25 ppm or less, and particularly preferably 5 ppm or less.

In the production of the aliphatic polyester copolymer according to the present invention, a drying agent can be used for the purpose of removing water in the solvent in the case of reacting using a solvent. The drying agent used is not particularly limited. Specific examples of the drying agent that can be used in the present invention include molecular sieves such as molecular sieve 3A, molecular sieve 4A, molecular sieve 5A and molecular sieve 13X; an ion-exchange resin, alumina, silicagel, calciumchloride, calciumsulfate, diphosphorus pentaoxide, concentrated sulfuric acid, magnesium perchlorate, barium oxide, calcium oxide, potassium hydroxide, sodium hydroxide, metal hydrides such as calcium hydride, sodium hydride and lithium aluminum hydride; and alkali metals such as sodium.

Those can be used alone or as mixtures of two or more thereof. Above all, molecular sieves and an ion-exchange resin are preferable from ease of handling and regeneration.

In the production of the aliphatic polyester copolymer according to the present invention, the reaction temperature is from 100 to 240° C. in any case of a solution polymerization method, a melt polymerization method and a solid phase polymerization method. In general, the reaction temperature is more preferably in a range of from 110 to 200° C., considering progress of copolymerization reaction, color tint of the aliphatic polyester copolymer obtained, and the like.

In the case of using the organic solvent, the reaction is generally conducted at a distillation temperature of the organic solvent used under atmospheric pressure. To adjust the reaction temperature to a preferable range, the reaction may be conducted under reduced pressure in the case of using a high-boiling organic solvent.

Further, because the organic solvent is azeotropic with water, there is no problem if the reaction substantially progresses at a predetermined temperature even if the boiling point drops.

In the case of producing the aliphatic polyester copolymer by a solution polymerization method in the present invention, a method of recovering the aliphatic polyester copolymer as a reaction product from a reaction solution after completion of the reaction is not particularly limited so long as the reaction product can substantially be recovered with the desired purity.

The recovery method of the reaction product may employ any conventional methods. Specifically, a method of recovering by removing the catalyst, dissolving the reaction solution in an appropriate solvent, and discharging in an excess poor solvent, a method of recovering by deactivating the catalyst, and removing the solvent by evaporation.

The weight average molecular weight of the aliphatic polyester copolymer in the present invention is generally from 5,000 to 1,000,000, but considering mechanical properties, thermal properties and moldability, is preferably from 10,000 to 500,000, more preferably from 35,000 to 200,000, and further preferably from 40,000 to 100,000.

The glass transition temperature (Tg) of the aliphatic polyester copolymer according to the present invention is not particularly limited if it is higher than Tg of a homopolymer of the aliphatic polyester contained in the copolymer, but is preferably from 40 to 220° C., further preferably from 60 to 200° C., and more preferably from 80 to 150° C. The glass transition temperature (Tg) shown in the present invention means one btained by differential scanning calorimeter (DSC analysis) in a temperature range of from 30 to 250° C. at a temperature rising rate of 10° C./min with a differential scanning calorimeter (DSC-60, a product of Shimadzu Corporation).

Haze of the aliphatic polyester copolymer according to the present invention is preferably 10% or less, preferably 5% or less, and most preferably 1% or less, at a thickness of 100 μm. To obtain the aliphatic polyester copolymer which is excellent in transparency, it is preferable to contain a structure derived from lactic acid or lactide as the aliphatic polyester unit (b) in the aliphatic polyester copolymer.

Mechanical properties of the aliphatic polyester copolymer according to the present invention are that break strength and/or yield strength in a tensile test are preferably from 30 to 100 MPa, and more preferably from 40 to 80 MPa.

The properties in the molten state of the aliphatic polyester copolymer according to the present invention are that at the measurement temperature of 240° C., melt flow index (MI) is preferably 15 (g/min) or more, more preferably 20 (g/min) or more, and further preferably 30 (g/min) or more. Measurement method of MI is according to JIS K7210.

Molding method of the aliphatic polyester copolymer obtained by the present invention is not particularly limited. Specifically, molding methods such as injection molding, extrusion molding, inflation molding, extrusion blow molding, foam molding, calender molding, blow molding, balloon molding, vacuum molding and spinning are applied.

The sheet in the present invention means any of a sheet and a film, having a thickness of from about 10 μm to about 10 mm.

Application of the aliphatic polyester copolymer in the present invention is not particularly limited, but utilizing the characteristics of excellent heat resistance and transparency, it can suitably be used as containers, packaging materials and substitutes for resins widely used.

Specifically, it can be used as follows. Members of writing goods such as a ballpoint pen, a mechanical pencil and a pencil; members of stationeries; golf tees; members for smoke golf balls for opening pitch ceremony; capsules for oral medicines; carriers for anal and vaginal suppositories; carriers for skin and mucous plasters; capsules for agrichemicals; capsules for fertilizers; capsules for seed and seedling; composts; reels for fishing lines; floats for fishing, artificial flies for fishery; lures; buoy for fishery; decoys for hunting; shotgun capsules for hunting; camping outfits such as table wares; nails; piles; bundle materials; slip stoppers for mud and snowy load; blocks; lunch boxes; table wares; containers for lunches and prepared foods, sold in convenience stores; chopsticks; disposable chopsticks; forks; spoons; skewers; tooth picks; cups for instant noodles; cups used in vending machines of drinks; containers or trays for eatables such as fresh fishes, dressed meats, vegetables and fruits, soybean curds and prepared foods; boxes used in fresh fish markets; bottles for milk products such as milks, yoghurts and lactic acid bacteria beverages; bottles for soft drinks such as carbonated drinks and cold drinks; bottles for alcoholic drinks such as beer and whiskeys; bottles with or without pump for shampoos or liquid soaps; tubes for tooth powder; cosmetic containers; detergent containers; bleach containers; cool boxes; flowerpots; casings for water-purifying cartridges; casings of artificial livers or artificial kidneys; members of injection syringes; cushioning materials for using in transporting electric home appliances such as televisions and stereos; cushioning materials for using in transporting precision instruments such as computers, printers and clocks; and cushioning materials for using in transporting ceramic materials such as glasses and chinaware. Utilizing excellent heat resistance and transparency, it can suitably be used to applications of packaging films, containers for foods, egg packs, blister packs, compact discs (CD), CD-R, CD-ROM, LD, DVD, transparent conductive films, mini discs (MD), cassette tapes, video tapes, housings of personal computers and mobile phones, baby bottles, spout cups, and the like.

EXAMPLES

The present invention is described in detail by referring to the following Examples. The description of the Examples in the specification of the present application is the explanation to support understanding of the contents of the present invention, and the description is not the character which becomes the basis to narrowly understand the technical scope of the present invention. Measuring methods used in the Examples are as follows.

1) Weight Average Molecular Weight (Mw)

The weight average molecular weight (Mw) of the aliphatic polyester copolymer described in Examples 1 and 2 was obtained by measuring with a gel permeation chromatography (column temperature: 40° C., chloroform solvent), and comparing with a polystyrene as a sample of the standard. Further, the weight average molecular weight (Mw) of the aliphatic polyester copolymer described in Example 5 and the polyglycolic acid described in Comparative Example 2 was obtained by measuring with a gel permeation chromatography (column temperature: 35° C., hexafluoroisopropanol solvent), and comparing with a polymethyl methacrylate as a sample of the standard.

2) Glass Transition Temperature (Tg)

Excluding Comparative Example 2, a sample prepared by heating at 210° C. for 1 minute and then quenching on ice was subjected to differential scanning calorimeter analysis (DSC analysis) in a temperature range of from 30 to 250° C. at a temperature rising rate of 10° C./min with a scanning calorimeter (DSC-60, a product of Shimadzu Corporation). Regarding Comparative Example 2, a sample prepared by heating to 250° C. at a temperature rising rate of 10° C./min and then quenching in liquid nitrogen was subjected to differential thermoanalysis (DSC analysis) in a temperature range of from 20 to 250° C. at a temperature rising rate of 10° C./min.

3) Transparency

Transparency of the film samples in Examples 3 and 4 was that Haze (cloudiness) was measured with Haze meter TC-H III (a product of Tokyo Denshoku Co., Ltd.) according to JIS K-6714.

4) Tensile Break Strength and Tensile Yield Strength

Tensile strength in Examples 3 and 4 was measured according to JIS K-7113.

Production Example 1

106.12 g of isosorbide (a reagent of Tokyo Chemical Industry Co., Ltd.), 80.15 g of acetonitrile and 126.40 g of pyridine were charged in a 500 ml round-bottom flask to dissolve isosorbide at room temperature. Because the inner temperature elevated after initiation of charging phosgene, 74.02 g of phosgene was charged over 2 hours while maintaining the inner temperature at 50° C. After aging at 50° C. for 1 hour, the reaction mass was transferred to a 1 liter beaker, where the reaction mass was diluted with 400 g of acetonitrile, and the reaction mass was clouded with 41.41 g of methanol. The clouded reaction mass was discharged in 3 liters of water having 150 ml of 1N-hydrochloric acid aqueous solution introduced therein to precipitate a polymer. After filtration, water washing was repeated several times, and methanol washing was conducted. After filtration, the polymer was dried at 50° C. under nitrogen atmosphere to obtain 111.88 g (=89.5%) of an aliphatic polycarbonate.

The aliphatic polycarbonate obtained had Mw=19,000 and a glass transition temperature=163.1° C.

Production Example 2

106.19 g of isosorbide (a reagent of Tokyo Chemical Industry Co., Ltd.) and 376.28 g of pyridine were charged in a 1,000 ml round-bottom flask to dissolve isosorbide at room temperature. Because the inner temperature elevated after initiation of charging phosgene, phosgene was further charged while maintaining the inner temperature at 50° C. Because viscosity of the reaction mass increased during charging phosgene, 103.44 g of pyridine was added, and ultimately 89.0 g of phosgene was charged over 9 hours. After completion of charging phosgene, the reaction mass was transferred to a 2 liters beaker, and 750 g of chloroform and 100 g of methanol were charged to dilute the reaction mass. The reaction mass was discharged in 4 liters of methanol to reprecipitate the polymer, followed by filtration to thereby recover the polymer. The polymer recovered and 1,000 ml of 0.5N-hydrochloric acid aqueous solution were charged in a 2 liters beaker, and stirred at room temperature for 30 minutes. After filtration, the polymer recovered was washed with 1,000 ml of methanol three times. After filtration, the polymer was dried at 50° C. under nitrogen atmosphere to obtain 106.73 g (=85.4%) of an aliphatic polycarbonate.

The aliphatic polycarbonate obtained had Mw=81,000 and a glass transition temperature=175.5° C.

Example 1

18.06 g of a polylactic acid (H-100 grade) manufactured by Cargill Dow LLC, 12.00 g of the aliphatic polycarbonate synthesized in Production Example 1 and 91.22 g of 1,3-dimethyl-2-imidazolidinone were charged in a 300 ml round-bottom flask. After replacing the inner atmosphere with nitrogen, the temperature was elevated from room temperature to 140° C. under ordinary pressure/nitrogen atmosphere. At the time that the polylactic acid and the aliphatic polycarbonate synthesized in Production Example 1 were dissolved, 0.5552 g of tin octanoate, a reagent of Wako Pure Chemical Industries, Ltd., was charged to react at 140° C./ordinary pressure under nitrogen atmosphere for 23 hours.

After completion of the reaction, the reaction mass was charged in 770 ml of 1N-hydrochloric acid aqueous solution to precipitate a polymer. After filtration, 700 ml of distilled water was charged to wash the polymer with the water. After filtration, the polymer was again washed with isopropyl alcohol. After filtration, the polymer was dried under nitrogen atmosphere to obtain 20.92 g (=69.6%) of an aliphatic polyester copolymer.

The aliphatic polyester copolymer obtained had Mw=8,800 and a glass transition temperature=82.7° C.

Example 2

7.22 g of a polylactic acid (H-100 grade, Mw=149,000) manufactured by Cargill Dow LLC, 32.83 g of the aliphatic polycarbonate synthesized in Production Example 1 and 80.09 g of 1,3-dimethyl-2-imidazolidinone were charged in a 300 ml round-bottom flask having connected thereto a unit such that a solvent refluxed again returns to the flask by passing through a layer charged with 40.09 g of molecular sieves 3A. After replacing the inner atmosphere with nitrogen, the inner pressure was reduced to 60 mmHg at room temperature, and the inner temperature was elevated to 140° C. After holding at 140° C./60 mmHg for 3 hours, 0.1061 g of tin octanoate, a reagent of Wako Pure Chemical Industries, Ltd., was charged to react at 140° C./60 mmHg for 19 hours.

After completion of the reaction, the reaction mass was charged in 1,000 ml of 1N-hydrochloric acid aqueous solution to precipitate a polymer. After filtration, 1,000 ml of distilled water was charged to wash the polymer with the water. After filtration, the polymer was again washed with 1,000 ml of isopropyl alcohol. After filtration, the polymer was dried under nitrogen atmosphere to obtain 28.84 g (=72.0%) of an aliphatic polyester copolymer.

The aliphatic polyester copolymer obtained had Mw=26,000 and a glass transition temperature=152.3° C.

Example 3

36.06 g of a polylactic acid (H-100 grade, Mw=149,000) manufactured by Cargill Dow LLC, 24.02 g of the aliphatic polycarbonate synthesized in Production Example 2 and 120.05 g of 1,3-dimethyl-2-imidazolidinone were charged in a 500 ml round-bottom flask having connected thereto a unit such that a solvent refluxed again returns to the flask bypassing through a layer charged with 30.07 g of molecular sieves 3A. After replacing the inner atmosphere with nitrogen, the inner pressure was reduced to 60 mmHg at room temperature, and the inner temperature was elevated to 140° C. After holding at 140° C./60 mmHg for 3 hours, 1.0238 g of tin octanoate, a reagent of Wako Pure Chemical Industries, Ltd., was charged to react at 140° C./60 mmHg for 18 hours.

After completion of the reaction, the reaction mass was charged in 1,000 ml of 1N-hydrochloric acid aqueous solution to precipitate a polymer. After filtration, 1,000 ml of methanol was charged to wash the polymer, and the operation was repeated three times. After filtration, the polymer was dried at 50° C. under nitrogen atmosphere to obtain 45.06 g (=75.0%) of an aliphatic polyester copolymer.

The aliphatic polyester copolymer obtained had Mw=52,000 and a glass transition temperature=89.3° C.

This aliphatic polyester copolymer was heat pressed at 160° C. to prepare a press film having a thickness of 100 μm. The transparency (Haze) was less than 1%.

Tensile yield strength of this aliphatic polyester copolymer was 65 MPa.

Example 4

30.03 g of a polylactic acid (H-100 grade, Mw=149,000) manufactured by Cargill Dow LLC, 30.02 g of the aliphatic polycarbonate synthesized in Production Example 2 and 120.05 g of 1,3-dimethyl-2-imidazolidinone were charged in a 500 ml round-bottom flask having connected thereto a unit such that a solvent refluxed again returns to the flask by passing through a layer charged with 30.07 g of molecular sieves 3A. After replacing the inner atmosphere with nitrogen, the inner pressure was reduced to 60 mmHg at room temperature, and the inner temperature was elevated to 140° C. After holding at 140° C./60 mmHg for 3 hours, 1.0237 g of tin octanoate, a reagent of Wako Pure Chemical Industries, Ltd., was charged to react at 140° C./60 mmHg for 18 hours.

After completion of the reaction, the reaction mass was charged in 1,000 ml of 1N-hydrochloric acid aqueous solution to precipitate a polymer. After filtration, 1,000 ml of methanol was charged to wash the polymer, and the operation was repeated three times. After filtration, the polymer was dried at 50° C. under nitrogen atmosphere to obtain 46.23 g (=77.0%) of an aliphatic polyester copolymer.

The aliphatic polyester copolymer obtained had Mw=45,000 and a glass transition temperature=100.2° C.

This aliphatic polyester copolymer was heat pressed at 170° C. to prepare a press film having a thickness of 100 μm. The transparency (Haze) was less than 1%.

Tensile yield strength of this aliphatic polyester copolymer was 50 MPa.

Example 5

30.11 g of glycolide manufactured by Daiwa Kasei Co., Ltd. and 20.02 g of the aliphatic polycarbonate synthesized in Production Example 1 were charged in a 200 ml separable flask, and held at room temperature/6 mmHg for three hours. After returning to ordinary pressure with nitrogen, the temperature was elevated to 220° C. under nitrogen atmosphere. 1.5 hours later from the initiation of temperature rising, 0.0229 g of tin octanoate, a reagent of Wako Pure Chemical Industries, Ltd., was charged to react at 220° C./ordinary pressure under nitrogen atmosphere for 5 hours.

After completion of the reaction, the reaction mass was discharged in a porcelain enamel vat to obtain 40.12 g (=80.0%) of an aliphatic polyester copolymer.

The aliphatic polyester copolymer obtained had Mw=26,000, a glass transition temperature=60.1° C., a crystallization temperature=143.6° C. and a melting point=199.7° C.

Comparative Example 1

Glass transition temperature of a polylactic acid having a weight average molecular weight=143,000 was 61.7° C.

Comparative Example 2

Glass transition temperature of a polyglycolic acid having a weight average molecular weight=200,000 was 37.7° C.

INDUSTRIAL APPLICABILITY

The aliphatic polyester copolymer of the present invention comprising the aliphatic polycarbonate unit and the aliphatic polyester unit according to the present invention has excellent heat resistance, and are suitable to optical disc substrates, containers and packaging materials, and can be used as a substitute of general-purpose resins.

The invention claimed is:

1. An aliphatic polyester copolymer comprising an aliphatic polycarbonate unit (a) represented by the general formula (1):

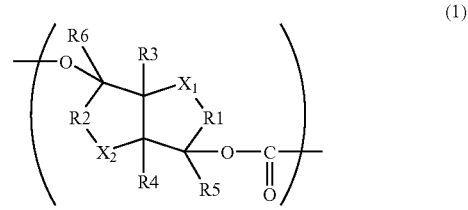

wherein $X_1$ and $X_2$ are O, N—R7 or S, and may be the same or different, R1 and R2 are an alkylene chain having from 1 to 10 carbon atoms, and may be linear or branched, and R3 to R7 are a hydrogen atom, an alkyl group having 1 to 10 carbon atoms, a cycloalkyl group or a phenyl group, wherein the alkyl group may be linear or branched, and the cycloalkyl group and phenyl group may have a substituent, and an aliphatic polyester unit (b), wherein the aliphatic polyester unit (b) is a structure derived from lactic acid.

2. The aliphatic polyester copolymer according to claim 1, wherein the aliphatic polycarbonate unit (a) is a structure derived from a product prepared from isosorbide and a carbonate precursor.

3. The aliphatic polyester copolymer according to claim 1, wherein a weight average molecular weight of the aliphatic polyester copolymer is from 10,000 to 500,000.

4. The aliphatic polyester copolymer according to claim 1, wherein a glass transition temperature of the aliphatic polyester copolymer is higher than a glass transition temperature of an aliphatic polyester having the same repeating unit as the aliphatic polyester unit (b) contained in the aliphatic polyester copolymer.

5. The aliphatic polyester copolymer according to claim 1, wherein haze of the aliphatic polyester copolymer is 5% or less.

6. A molded body comprising the aliphatic polyester copolymer according to claim 1.

7. An optical disc substrate comprising the aliphatic polyester copolymer according to claim 1.

8. A sheet comprising the aliphatic polyester copolymer according to claim 1.

9. A container comprising the aliphatic polyester copolymer according to claim 1.

10. The aliphatic polyester copolymer according to claim 2, wherein a compositional ratio of the aliphatic polycarbonate unit (a) and the aliphatic polyester unit (b) is (a)/(b)=5/95 to 50/50 wt %.

11. The aliphatic polyester copolymer according to claim 1, wherein a compositional ratio of the aliphatic polycarbonate unit (a) and the aliphatic polyester unit (b) is (a)/(b)=5/95 to 50/50 wt %.

* * * * *